United States Patent
Tsai et al.

(10) Patent No.: US 7,937,053 B2
(45) Date of Patent: May 3, 2011

(54) METHOD FOR RECEIVING STATION SIGNAL AND RECEIVER FOR RECEIVING THE SAME

(75) Inventors: Tien-Ju Tsai, Tainan (TW); Shu-Ming Liu, Tainan (TW)

(73) Assignee: Himax Technologies Limited, Tainan County (TW)

( * ) Notice: Subject to any disclaimer, the term of this patent is extended or adjusted under 35 U.S.C. 154(b) by 831 days.

(21) Appl. No.: 11/808,290

(22) Filed: Jun. 8, 2007

(65) Prior Publication Data

US 2008/0303958 A1 Dec. 11, 2008

(51) Int. Cl.
*H04B 1/18* (2006.01)

(52) U.S. Cl. ........... 455/161.1; 455/164.2; 455/192.1; 455/161.3

(58) Field of Classification Search .... 455/161.1–164.2, 455/182.1–182.3, 192.1–192.3
See application file for complete search history.

(56) References Cited

U.S. PATENT DOCUMENTS

| | | | | |
|---|---|---|---|---|
| 4,264,977 A * | 4/1981 | Deiss | | 455/182.3 |
| 5,125,105 A * | 6/1992 | Kennedy et al. | | 455/164.1 |
| 5,222,255 A * | 6/1993 | Kuo et al. | | 455/266 |
| 5,430,891 A * | 7/1995 | Kianush et al. | | 455/184.1 |
| 5,450,621 A * | 9/1995 | Kianush et al. | | 455/192.2 |
| 5,487,186 A * | 1/1996 | Scarpa | | 455/192.2 |
| 5,564,093 A * | 10/1996 | Matsumoto | | 455/266 |
| 5,621,767 A * | 4/1997 | Brandt et al. | | 375/344 |
| 6,101,369 A * | 8/2000 | Takahashi | | 455/182.2 |
| 6,281,946 B1 * | 8/2001 | Hisada et al. | | 348/725 |
| 6,421,099 B1 * | 7/2002 | Oh | | 348/732 |
| 6,807,405 B1 * | 10/2004 | Jagger et al. | | 455/296 |
| 7,031,680 B2 * | 4/2006 | Raj et al. | | 455/161.3 |
| 7,415,255 B2 * | 8/2008 | Wakui et al. | | 455/130 |
| 7,592,765 B2 * | 9/2009 | Rahman et al. | | 318/400.02 |
| 2005/0101273 A1* | 5/2005 | Suto | | 455/179.1 |
| 2008/0045167 A1* | 2/2008 | Yoshida | | 455/131 |
| 2008/0225182 A1* | 9/2008 | Silver et al. | | 348/726 |

* cited by examiner

*Primary Examiner* — Duc M Nguyen
(74) *Attorney, Agent, or Firm* — Bacon & Thomas, PLLC

(57) ABSTRACT

A method for receiving a station signal is provided. First, a radio frequency signal is received and converted to a first IF signal. Next, the first IF signal is demodulated to a baseband signal and a demodulation signal is obtained, the demodulation signal being a result of differentiating a phase of the baseband signal. Then a determination as to whether a DC level of the demodulation signal has an S-curve characteristic at a specific frequency is made according to the demodulation signal. If so, the specific frequency is determined as a first station frequency, a first station signal is obtained from the radio frequency signal according to the first station frequency.

25 Claims, 4 Drawing Sheets

METHOD FOR RECEIVING STATION SIGNAL AND RECEIVER FOR RECEIVING THE SAME

BACKGROUND OF THE INVENTION

1. Field of the Invention

The invention relates in general to a method for receiving a station signal and a receiver for receiving the same, and more particularly to a method for receiving a station signal and a receiver for receiving the same capable of automatically scanning a station frequency.

2. Description of the Related Art

Conventional TV systems adopting analog modulating method include USA-dominated NTSC system, EU-dominated PAL system and USSR-dominated SECAM system. As for audio modulation, the carrier frequency modulation is normally adopted to transmit a radio frequency signal, and is also referred as frequency modulation (FM).

Generally, the FM radio also adopts frequency modulation in transmitting a radio frequency signal, and the bandwidth approximately ranges between 76~108 MHz (the bandwidth ranges between 87~108 MHz in USA/Taiwan, and ranges between 76~90 MHz in Japan). The bandwidth is divided in an interval of 200 KHz to create a channel. The transmitter modulates the frequency of the radio frequency signal in a channel and transmits the frequency modulation signal to a receiver.

Some of the conventional TVs or frequency modulation receivers possess an auto scanning function. That is, a mixed frequency of a receiver is increased or decreased, such that a determination as to whether the frequency is locked by a phase lock loop (PLL) is made, and the existence of a station signal is detected by the squelch detector. However, the reliability of the result of detection obtained by auto scanning mentioned above is changed according to the temperature and the time of the working environment. Besides, it is difficult to apply auto scanning to the working environment of multiple communication systems.

SUMMARY OF THE INVENTION

The invention is directed to a method for receiving a station signal and a receiver for receiving the same. After the radio frequency signal is demodulated to a demodulation signal, the DC level of the demodulation signal has an S-curve characteristic at a station frequency, such that the receiver automatically scans a station frequency and calculates the occurrences of over modulation of the baseband signal within a limited time, hence filtering the signal with reference to reception quality.

According to a first aspect of the present invention, a method for receiving a station signal is provided. First, a radio frequency signal is received and converted to a first IF signal Next, the first IF signal is demodulated to a baseband signal and a demodulation signal is obtained within, the demodulation signal being a result of differentiating a phase of the baseband signal. Then a determination as to whether a DC level of the demodulation signal has an S-curve characteristic around a specific frequency is made according to the demodulation signal. If so, the specific frequency is determined as a first station frequency, a station signal is obtained from the radio frequency signal according to the first station frequency and is received.

According to a second aspect of the present invention, a station signal receiver is provided. The station signal receiver comprises an antenna, a tuner, a demodulator and a processing unit. The antenna is for receiving a radio frequency signal. The tuner is for converting the radio frequency signal to a first IF signal. The demodulator is for demodulating the first IF signal to a baseband signal and obtaining a demodulation signal. The demodulator comprises a first mixer, a first low pass filter and a discriminator. The first mixer is for converting the first IF signal to a mixing signal having a central frequency located within a baseband. The first low pass filter is for filtering the mixing signal to obtain the baseband signal. The discriminator is for differentiating a phase of the baseband signal to obtain the demodulation signal. A determination as to whether the demodulation signal has an S-curve characteristic around a specific frequency according to the demodulation signal is determined by the processing unit. If the DC level of the demodulation signal has an S-curve characteristic at around the specific frequency, then the specific frequency is determined as a first station frequency, and a first station signal is obtained and received from the radio frequency signal according to the first station frequency by the station signal receiver.

The invention will become apparent from the following detailed description of the preferred but non-limiting embodiments. The following description is made with reference to the accompanying drawings.

DETAILED DESCRIPTION OF THE INVENTION

The invention provides a method for receiving a station signal and a receiver for receiving the same. After a radio frequency signal is demodulated into a demodulation signal, the DC level of the demodulation signal has an S-curve characteristic at a station frequency, such that the receiver automatically scans a station frequency and calculates the occurrences of over modulation of the baseband signal within a limited time, hence filtering the signal with reference to the reception quality.

Figure 1:
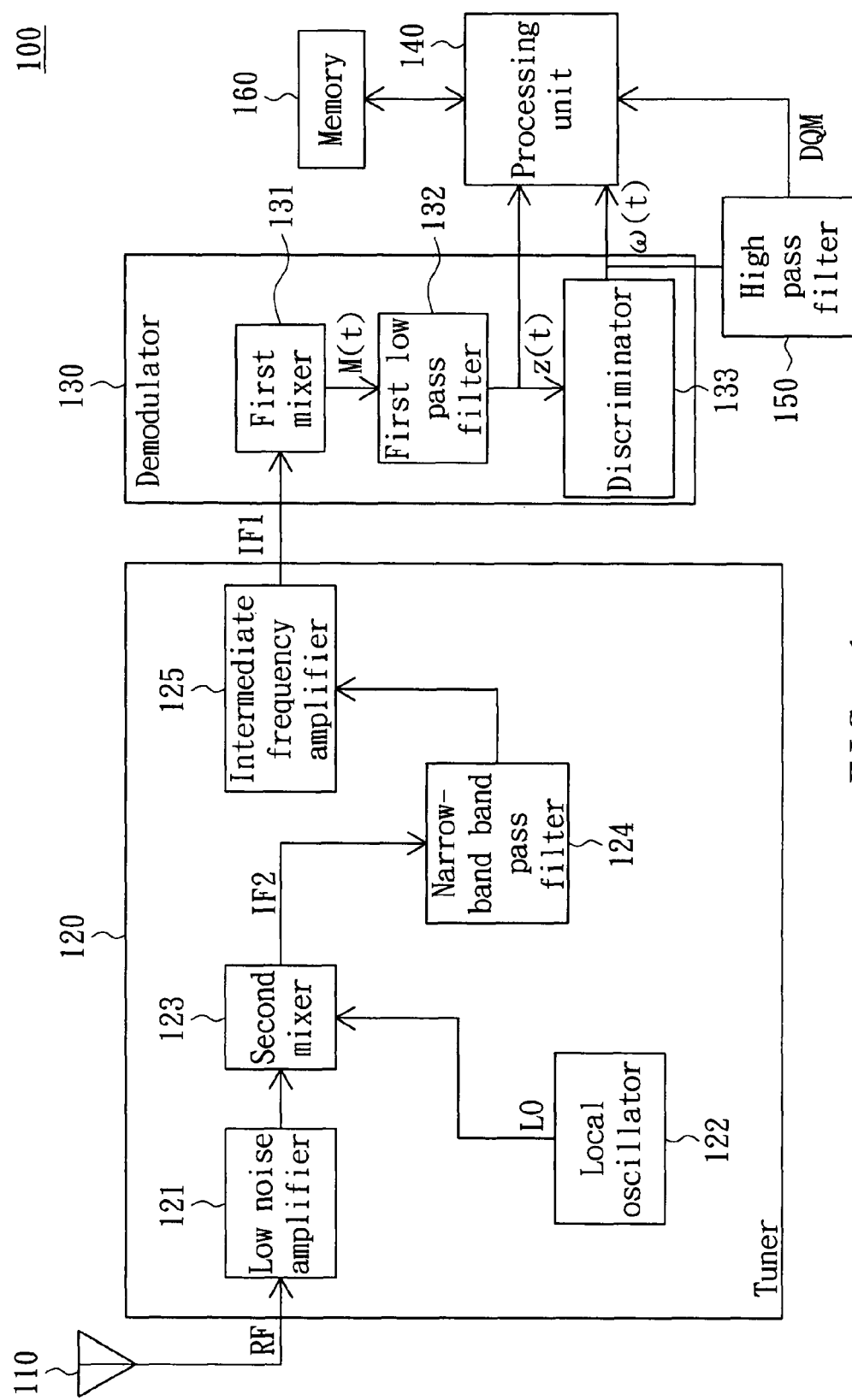
FIG. 1 is a perspective of a station signal receiver according to a preferred embodiment of the invention.

Referring to FIG. 1, a perspective of a station signal receiver according to a preferred embodiment of the invention is shown. The station signal receiver 100 includes an antenna 110, a tuner 120, a demodulator 130 and a processing unit 140. The antenna 110 is for receiving a radio frequency signal RF, such as a frequency modulation signal. The radio frequency signal RF has a bandwidth including an upper-limit frequency and a lower-limit frequency. In Taiwan, the upper-limit frequency of the radio frequency signal RF is 87 MHz, and the lower-limit frequency of the radio frequency signal RF is 108 MHz.

The tuner 120 is for converting the radio frequency signal RF to a first intermediate frequency (IF) signal IF1. Take the tuner 120 be a superheterodyne tuner as exemplified without limitation thereto. The tuner 120 may be other kinds of tuner, such as a direct conversion tuner. The tuner 120 includes a low noise amplifier (LNA) 121, a local oscillator 122, a second mixer 123, a narrow-band band pass filter 124 and an IF amplifier 125. The LNA 121 is for amplifying the radio frequency signal RF and outputting the amplified radio frequency signal RF to the second mixer 123. The second mixer 123 is coupled to the LNA 121 and is for down-converting the radio frequency signal RF to a second IF signal IF2 according to a local oscillation frequency LO provided by the local oscillator 122. Substantially, the local oscillation frequency LO provided by the local oscillator 122 is changed continuously to implement the auto scanning.

The narrow-band band pass filter 124 is a surface acoustic wave filter (SAW filter) for example. In actual procedure, the second mixer 123 down-converts the radio frequency signal RF with some noise. So, the narrow-band band pass filter 123 is utilized for filtering the second IF signal LF2 to filter out the noise, obtain the target portion and output the target portion to the IF amplifier 125. The IF amplifier 125 is coupled to the narrow-band band pass filter 124 and is for amplifying the filtered second IF signal IF2 to the first IF signal IF1.

The demodulator 130 is for demodulating the first IF signal IF1 to a baseband signal z(t) and obtaining a demodulation signal ω(t), substantially a result of differentiating a phase of the baseband signal z(t). The demodulator 130 includes a first mixer 131, a first low pass filter 132 and a discriminator 133. The first mixer 131 is for converting the first IF signal IF1 to a mixing signal M(t) having a central frequency located within a baseband. The first mixer 131 substantially down-converts the first IF signal IF1 to the baseband. The baseband is not limited thereto and is decided according to the system that the radio frequency signal received by the station signal receiver 100 belongs to.

The mixing signal M(t) substantially includes a high frequency term and a term, being the target, in the baseband. Therefore, the first low pass filter 132 is for filtering the mixing signal M(t) to obtain the term in the baseband. That is, the baseband signal z(t) is obtained. The discriminator 133, such as a frequency modulation discriminator, is coupled to the first low pass filter 132. The discriminator 133 is for obtaining the phase of the baseband signal z(t) and differentiating the phase of the baseband signal z(t), so that the demodulation signal ω(t) is derived. The demodulation signal ω(t) is described as the following equation (1):

$$\omega(t) = -2\pi \times \Delta f + K_0 \times R(t) = -2\pi \times (fc-fs) + K_0 \times R(t) \quad \text{eq. (1)}$$

wherein "Δf" means a carrier frequency offset, Δf is equal to (fc−fs), "fc" is scanning frequency when the station signal receiver 100 performs the auto scanning function. By changing the local oscillation frequency LO provided by the local oscillator 122, the scanning frequency fc can be changed. The term "fs" is station frequency, that is, the carrier frequency which is used when the transmitter transmits the message. "$K_0$," means a FM deviation constant, and "R(t)" means a station signal, which is the message for modulating the carrier frequency in the transmitter.

The processing unit 140 is for determining whether the DC level of the demodulation signal ω(t) has an S-curve characteristic at around a specific frequency fc0 according to the demodulation signal ω(t). The specific frequency fc0 is the frequency with small DC level. Preferably, the specific frequency fc0 is the frequency corresponding to the zero crossing of the S-curve. If the DC level of the demodulation signal ω(t) has the S-curve characteristic at the specific frequency fc0, then the specific frequency fc0 is determined as a station frequency fs. The station signal R(t) is obtained from the radio frequency signal RF according to the station frequency fs by the station signal receiver 100. The station frequency fs ranges between the upper-limit frequency and the lower-limit frequency.

The station signal receiver 100 further includes a high pass filter 150. The high pass filter 150 is for receiving and filtering the demodulation signal ω(t) to get a parameter DQM. The parameter DQM is the occurrence of over modulation of the baseband signal z(t) at the station frequency fs. The demodulation signal ω(t) substantially contains high frequency noise. When the high frequency noise is too severe, a frequency deviation of the baseband signal z(t) is lager than a threshold deviation, such that the baseband signal z(t) is determined as being over modulated. The high pass filter 150 is for filtering out the high frequency noise.

If the specific frequency fc0 is determined as the station frequency fs, the processing unit 140 measures the parameter DQM of the baseband signal z(t) at the station frequency fs through the high pass filter 150 in a limited time, such as a squelch time. If the parameter DQM is less than a reference value, the occurrences of over modulation of the baseband signal z(t) at the station frequency fs are acceptable, and a reception quality is determined as high by the processing unit 140. The station signal receiver 100 obtains the station signal R(t) from the radio frequency RF according to the station frequency fs. If the parameter DQM exceeds the reference value, the reception quality is determined as low by the processing unit 140. The station signal receiver 100 drops out the station frequency fs and continues to scan a next station frequency.

In addition, examples of the processing unit 140 include a software, a hardware, a firmware or an application specific integrated circuit (ASIC). The processing unit 140 replaces the phase lock loop applied to the conventional station signal receiver, and will not change according to the temperature and the time of the working environment, hence improving the entire reliability.

The station signal receiver 100 still includes a memory 160 for recording the station frequency fs, such that after a time interval, the station signal receiver 100 can obtain a corresponding station signal R(t) according to the station frequency fs stored in the memory 160. Besides, the station signal receiver 100 can scan multiple station frequencies at the same time and record the station frequencies in the memory 160. Therefore, when the station signal is to be received by the station signal receiver 100 next time, the station signal receiver 100 can obtain the target station signal through the station frequencies recorded in the memory 150, not only largely saving the time for re-scanning the station frequency but also greatly increasing the efficiency.

Figure 2:
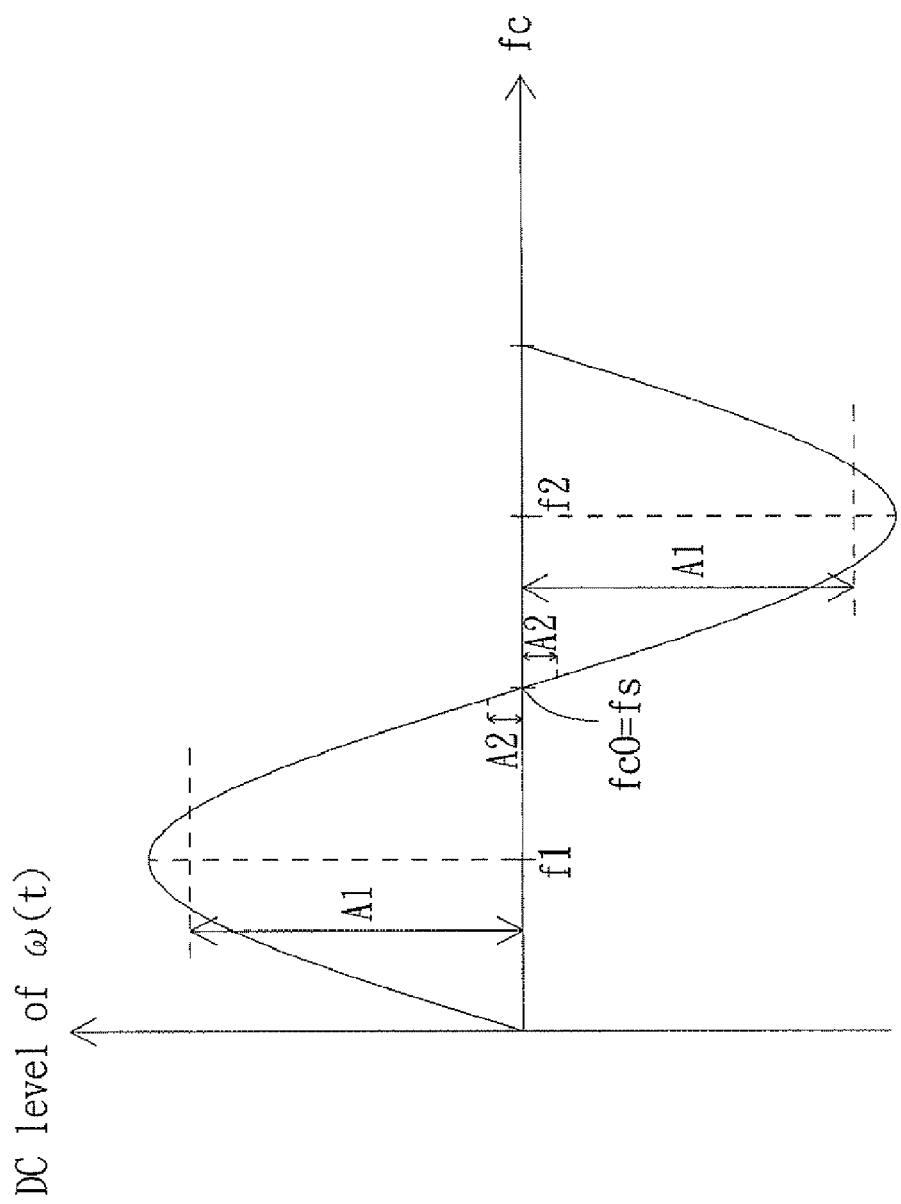
FIG. 2 is a diagram showing the S-curve characteristic the DC level of the demodulation signal $\omega(t)$ around a station frequency fs according to a preferred embodiment of the invention.

Referring to FIG. 2, a diagram showing the S-curve characteristic of the DC level of the demodulation signal ω(t) around a station frequency fs according to a preferred embodiment of the invention is shown. The S cure shown in FIG. 2 may be derived from the equation (1). As indicated in FIG. 2, there is a first frequency f1 around and lower than the station frequency fs. The DC level of the demodulation signal ω(t) is mainly dominated by the item "−2π×(fc−fs)" in eq. (1). The FIG. 2 shows the DC level of the demodulation signal ω(t) corresponding to different scanning frequency fc when the auto scanning function is performed and the local oscillation frequency LO provided by the local oscillator 122 is changed continuously to change the scanning frequency fc. The DC level of the demodulation signal ω(t) is positive at the first frequency f1 and the absolute value of the DC level of the demodulation signal ω(t) is larger than a first threshold value A1. Besides, the absolute value of the DC level of the demodulation signal ω(t) around the station frequency fs is smaller than a second threshold value A2.

In ideal, the DC level of the demodulation signal ω(t) has a zero-crossing characteristic at around the station frequency fs, that is the DC level is zero. Then, there is a second frequency f2 higher than the station frequency fs. The DC level of the demodulation signal ω(t) at the second frequency f2 is negative and the absolute value of the DC level is larger than the first threshold value A1.

When the station signal receiver 100 scans from an initial frequency to the upper-limit frequency, the first frequency f1 is first found. Meanwhile, the DC level of the demodulation signal ω(t) at the first frequency f1 is positive and the absolute value of the DC level at the first frequency f1 is larger than the first threshold value A1. Then the specific frequency fc0 may be the station frequency fs while the absolute value of the DC level of the demodulation signal ω(t) at the specific frequency fc0 is smaller than the second threshold value A2. After that, the second frequency f2 will be found and the DC level of the demodulation signal ω(t) at the second frequency f2 is negative and the absolute value of the DC level is larger than the first threshold value A1 at the same time. Consequently, the demodulation signal ω(t) is determined so as to have the S-curve characteristic at the specific frequency fc0, and the specific frequency fc0 is the station frequency fs. If the station signal receiver 100 scans from an initial frequency to the lower-limit frequency, the second frequency f2 is first found and the specific frequency fc0 and the first frequency f1 will be found afterward. And the demodulation signal ω(t) is determined so as to have the S-curve characteristic at the specific frequency fc0, and the specific frequency fc0 is the station frequency fs.

Besides, if the station signal receiver 100 scans from the initial frequency to the upper-limit frequency and the station frequency fs is still not located when the upper-limit frequency is reached, then the station frequency fs is searched from the lower-limit frequency to the initial frequency. If the station frequency fs is still not located when the initial frequency is reached, the scanning is stopped to prevent from wasted power consumption. Likewise, if the station signal receiver 100 scans from the initial frequency to the lower-limit frequency and the station frequency fs is still not located when the lower-limit frequency is reached, then the station frequency fs is searched from the upper-limit frequency to the initial frequency. If the station frequency fs is still not located when the initial frequency is reached, the scanning is stopped.

Figure 3:
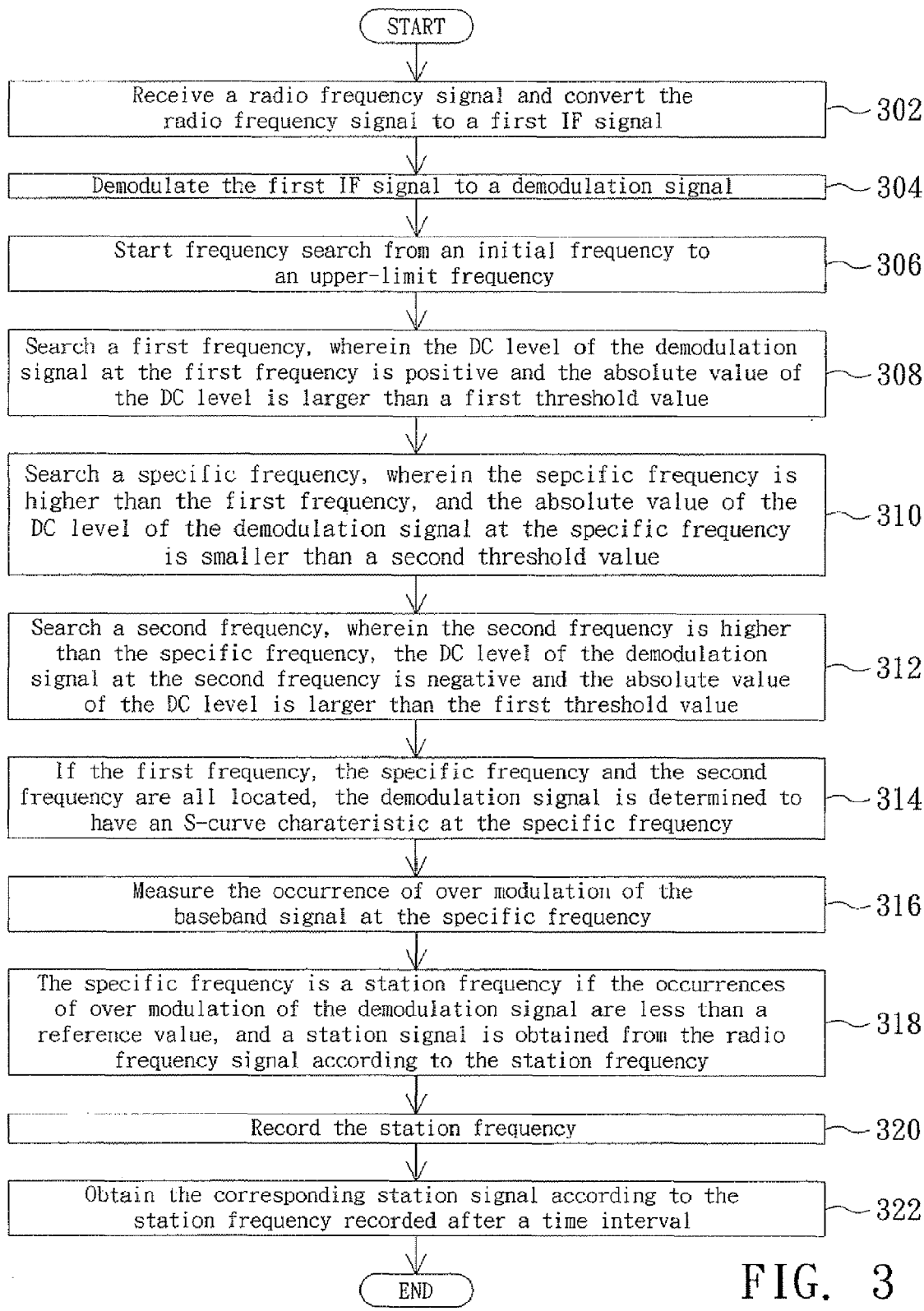
FIG. 3 is a flowchart of an example of a method for receiving a station signal according to a preferred embodiment of the invention.

Referring to FIG. 3, a flowchart of an example of a method for receiving a station signal according to a preferred embodiment of the invention is shown. At first, the method begins at step 302, a radio frequency signal is received and converted to a first IF signal. The radio frequency signal is a frequency modulation signal for example and has a bandwidth including an upper-limit frequency and a lower-limit frequency. In step 302, the radio frequency is amplified and down-converted to a second IF signal according to a local oscillation frequency substantially. Then the second IF signal is filtered and amplified to obtain the first IF signal.

Next, the method proceeds to step 304, the first IF signal is demodulated to a demodulation signal. In step 304, the first IF signal is substantially converted to a mixing signal, the mixing signal is filtered to obtain the baseband signal, and the phase of the baseband signal is differentiated to derive the demodulation signal. Afterwards, the method proceeds to step 306, frequency search is started from an initial frequency to the upper-limit frequency, wherein the initial frequency ranges between the upper-limit frequency and the lower-limit frequency. Next, the method proceeds to step 308, a first frequency is located, wherein the DC level of the demodulation signal at the first frequency is positive and the absolute value of the DC level is larger than a first threshold value.

Then, the method proceeds to step 310, a specific frequency is located, wherein the specific frequency is higher than the first frequency, and the absolute value of the DC level of the demodulation signal at the specific frequency is smaller than a second threshold value. Then, the method proceeds to step 312, a second frequency is located, wherein the second frequency is higher than the specific frequency, the DC level of the demodulation signal at the second frequency is negative and the absolute value of the DC level is larger than the first threshold value. Afterwards, the method proceeds to step 314, if the first frequency, the specific frequency and the second frequency are all located, then the DC level of the demodulation signal is determined to have an S-curve characteristic at the specific frequency.

The method proceeds to step 316, the occurrence of over modulation of the baseband signal at the specific frequency is measured in a limited time. The step 316 is substantially for detecting the reception quality. If the occurrences of over modulation of the baseband signal at the specific frequency are larger than a reference value, the reception quality is low and the specific frequency is dropped out. Then, the method proceeds to step 318, if the occurrences of over modulation of the baseband signal are less than the reference value, then the specific frequency is a station frequency, and a station signal is obtained from the radio frequency signal according to the station frequency. Then, the method proceeds to step 320, the station frequency is recorded. Next, the method proceeds to step 322, after a time interval, the corresponding station signal is obtained according to the station frequency recorded.

According to the above method for receiving a station signal, if the station frequency is still not located from a frequency increasing direction when an upper-limit frequency is reached, then the station frequency is searched from a lower-limit frequency along a frequency increasing direction to locate the station frequency, such that the station signal is obtained from the radio frequency signal by the station signal receiver according to the station frequency. If the station frequency is still not found when the initial frequency is reached, the scanning is stopped to save the power consumption.

Figure 4:
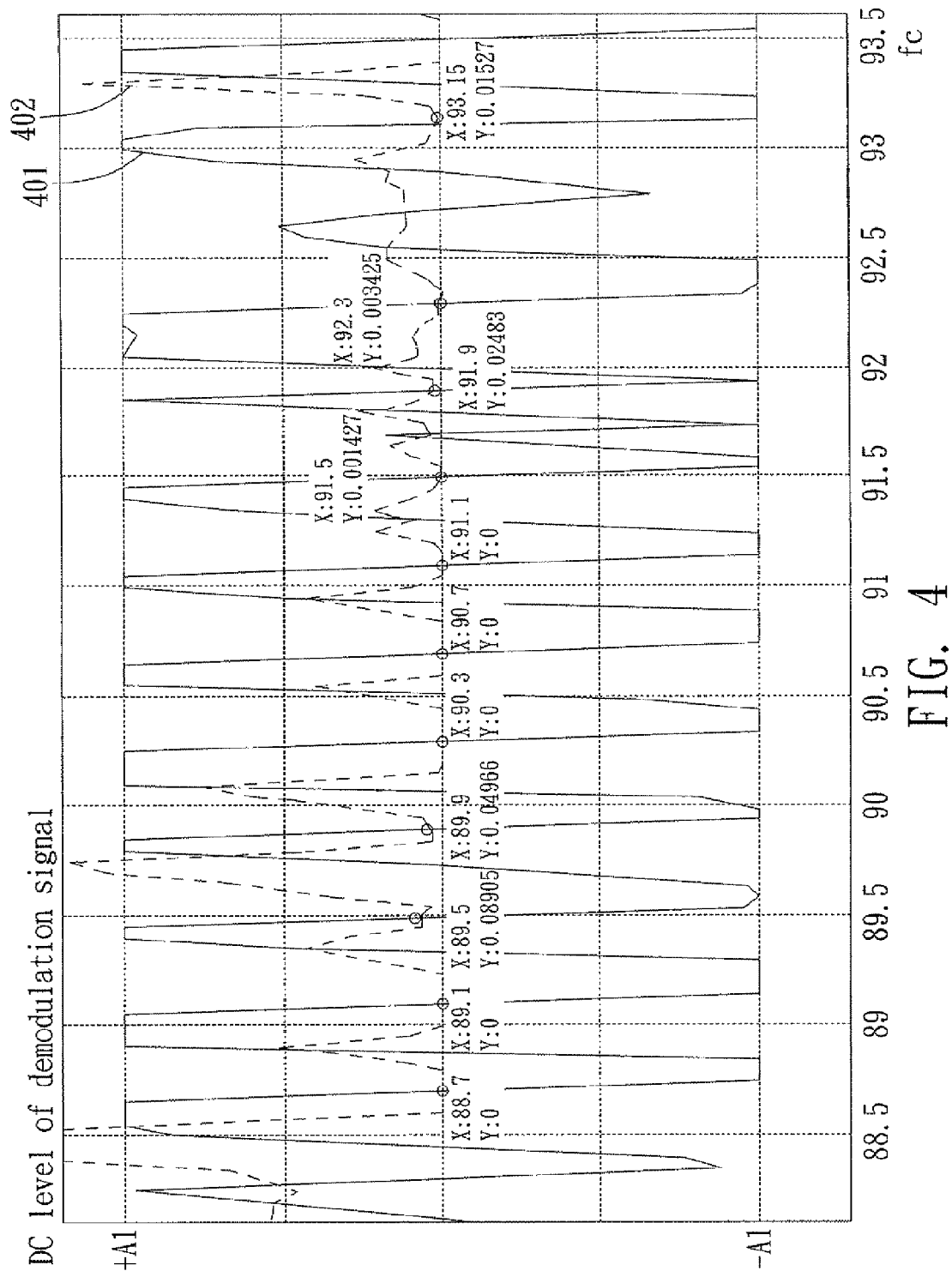
FIG. 4 is a perspective of an example of a method for receiving a station signal according to a preferred embodiment of the invention.

The above method for receiving a station signal is exemplified by way of scanning-up search. That is, the station frequency is located along a frequency increasing direction but is not limited thereto. However, the way of scanning-down is also applicable to the method for receiving a station signal of the invention. The principles of scanning-down search are the same with that of scanning-up search, and are not repeated here. Besides, according to the method for receiving a station signal of the invention, multiple station frequencies are scanned and recorded at the same time. Therefore, when the station signal is received next time, the target station signal is directly obtained by the station signal receiver from the station frequency recorded in the memory, not only largely saving the time for re-scanning the station frequency fs but also greatly increasing the efficiency. In addition, the occurrence of over modulation of the baseband signal in a limited time is measured and the reception quality is ensured. Referring to FIG. 4, a perspective of an example of a method for receiving a station signal according to a preferred embodiment of the invention is shown. Wherein the curve 401 denotes the DC level of the demodulation signal, the curve 402 denotes the parameter and "○" denotes the existence of the station frequency.

The invention provides a method for receiving a station signal and a receiver for receiving the same. By utilizing the characteristic of the DC level of the demodulation signal having an S-curve characteristic at a station frequency, the receiver automatically locates a station frequency. Examples of the processing unit of the receiver include a software, a hardware, a firmware or an application specific integrated circuit (ASIC), largely increasing reliability. Besides, the occurrence of over modulation of the baseband signal within a limited time is measured, hence assuring the quality of reception.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for receiving a station signal, the method comprising:
   receiving a radio frequency signal and converting the radio frequency signal to a first intermediate frequency (IF) signal;
   demodulating the first IF signal to a baseband signal and obtaining a demodulation signal, the demodulation signal being a result of differentiating a phase of the baseband signal;
   determining whether a DC level of the demodulation signal has an S-curve characteristic at a specific frequency according to the demodulation signal; and
   determining the specific frequency as a first station frequency, locating a first station signal from the radio frequency signal according to the first station frequency, and receiving the first station signal if the DC level of the demodulation signal has the S-curve characteristic at the specific frequency;
   wherein if the DC level of the demodulation signal is positive and the absolute value of the DC level of the demodulation signal is larger than a first threshold value at a first frequency lower than the specific frequency, the absolute value of the DC level of the demodulation signal is less than a second threshold value at the specific frequency, the DC level of the demodulation signal is negative, and the absolute value of the DC level of the demodulation signal is larger than the first threshold value at a second frequency higher than the specific frequency, it is determined that the DC level of the demodulation signal has the S-curve characteristic at the specific frequency.

2. The method for receiving a station signal according to claim 1, further comprising:
   recording the first station frequency: and
   obtaining the corresponding first station signal according to the first station frequency after a time interval.

3. The method for receiving a station signal according to claim 1, further comprising:
   searching a second station frequency at which the DC level of the demodulation signal has the S-curve characteristic;
   recording the second station frequency; and
   obtaining a corresponding second station signal according to the second station frequency.

4. The method for receiving a station signal according to claim 1, wherein the radio frequency signal has a bandwidth comprising an upper-limit frequency and a lower-limit frequency, and the scanning frequency ranges between the upper-limit frequency and the lower-limit frequency.

5. The method for receiving a station signal according to claim 4, wherein the frequency search is started from an initial frequency to the upper-limit frequency to find the first station frequency.

6. The method for receiving a station signal according to claim 5, wherein if the first station frequency is not found when the upper-limit frequency is reached, starting frequency search from the lower-limit frequency to the initial frequency to find the first station frequency.

7. The method for receiving a station signal according to claim 6, wherein if the first station frequency is still not found when the initial frequency is reached, stopping the searching.

8. The method for receiving a station signal according to claim 4, wherein the frequency search is started from an initial frequency to the lower-limit frequency to find the first station frequency.

9. The method for receiving a station signal according to claim 8, wherein if the first station frequency is not found when the lower-limit frequency is reached, starting frequency search from the upper-limit frequency to the initial frequency to find the first station frequency.

10. The method for receiving a station signal according to claim 9, wherein if the first station frequency is still not found when the initial frequency is reached, stopping the searching.

11. The method for receiving a station signal according to claim 1, further comprising:
    measuring a parameter of the baseband signal at the first station frequency in a limited time, the parameter being occurrence of over modulation of the baseband signal at the first station frequency; and
    obtaining the first station signal according to the first station frequency if the parameter is less than a reference value.

12. The method for receiving a station signal according to claim 11, wherein if the parameter is larger than the reference value, the first station frequency is dropped out and a next station frequency is then been searched.

13. The method for receiving a station signal according to claim 11, wherein if a frequency deviation of the baseband signal is larger than a threshold deviation, the baseband signal is over modulated.

14. The method for receiving a station signal according to claim 1, wherein the converting step comprises:
    amplifying the radio frequency signal and down-converting the radio frequency signal to a second IF signal according to a local oscillation frequency; and
    filtering the second IF signal and amplifying the second IF signal to obtain the first IF signal.

15. The method for receiving a station signal according to claim 1, wherein the demodulating step comprises:
    converting the first IF signal to a mixing signal, and filtering the mixing signal to obtain the baseband signal; and
    differentiating a phase of the baseband signal to obtain the demodulation signal.

16. A station signal receiver, comprising:
    an antenna for receiving a radio frequency signal;
    a tuner for converting the radio frequency signal to a first intermediate frequency (IF) signal;
    a demodulator for demodulating the first IF signal to a baseband signal and obtaining a demodulation signal, wherein the demodulator comprises:
    a first mixer for converting the first IF signal to a mixing signal having a central frequency located within a baseband;

a first low pass filter for filtering the mixing signal to obtain the baseband signal; and a discriminator for differentiating a phase of the baseband signal to obtain the demodulation signal; and a processing unit for determining whether the DC level of the demodulation signal has an S-curve characteristic at a specific frequency according to the demodulation signal;

wherein, if the DC level of the demodulation signal has the S-curve characteristic at the specific frequency, then the specific frequency is determined as a first station frequency, and a first station signal is obtained from the radio frequency signal by the station signal receiver according to the first station frequency; and wherein if the DC level of the demodulation signal is positive and the absolute value of the DC level of the demodulation signal is larger than a first threshold value at a first frequency lower than the specific frequency, the absolute value of the DC level of the demodulation signal is less than a second threshold value at the specific frequency, the DC level of the demodulation signal is negative, and the absolute value of the DC level of the demodulation signal is larger than the first threshold value at a second frequency higher than the specific frequency, the processing unit determines that the DC level of the demodulation signal has the S-curve characteristic at the specific frequency.

17. The station signal receiver according to claim 16, further comprising:

a memory for recording the first station frequency, such that after a time interval, the station signal receiver obtains the corresponding first station signal according to the first station frequency.

18. The station signal receiver according to claim 17, wherein the station signal receiver searches a second station frequency and records the second station frequency, the DC level of the demodulation signal has the S-curve characteristic at the second station frequency.

19. The station signal receiver according to claim 18, wherein the first station frequency and the second station frequency is searched along a specific direction of frequency.

20. The station signal receiver according to claim 16, wherein the radio frequency signal has a bandwidth comprising an upper-limit frequency and a lower-limit frequency, and the scanning frequency ranges between the upper-limit frequency and the lower-limit frequency.

21. The station signal receiver according to claim 16, wherein the processing unit includes at least one of a software, a hardware, a firmware and an application specific integrated circuit (ASIC).

22. The station signal receiver according to claim 16, further comprising;

a high pass filter for receiving and filtering the demodulation signal to obtain a parameter, the parameter being occurrence of over modulation of the baseband signal at the first station frequency.

23. The station signal receiver according to claim 22, wherein if a frequency deviation of the baseband signal is larger than a threshold deviation, the processing unit determines that the baseband signal is over modulated.

24. The station signal receiver according to claim 22, wherein the processing unit measures the parameter of the baseband signal at the first station frequency in a limited time, and the station signal receiver obtains the first station signal from the radio frequency signal according to the first station frequency if the parameter is less than a reference value.

25. The station signal receiver according to claim 16, further comprising;

a low noise amplifier for amplifying the radio frequency signal:

a local oscillator for providing a local oscillation frequency;

a second mixer coupled to the low noise amplifier and for down-converting the radio frequency signal to a second IF signal according to the local oscillation frequency;

a narrow-band band pass filter for filtering out noise of the second IF signal: and an IF amplifier coupled to the narrow-band band pass filter and for amplifying the second IF signal to obtain the first IF signal.

* * * * *